United States Patent [19]

Butler

[11] Patent Number: 5,152,146
[45] Date of Patent: Oct. 6, 1992

[54] FUEL CONTROL VALVE FOR AN AIRCRAFT GAS TURBINE ENGINE FUEL SYSTEM

[75] Inventor: Reginald J. Butler, Derby, England

[73] Assignee: Rolls-Royce plc, London, England

[21] Appl. No.: 829,572

[22] Filed: Feb. 3, 1992

Related U.S. Application Data

[63] Continuation of Ser. No. 504,017, Apr. 4, 1990, abandoned.

[30] Foreign Application Priority Data

Apr. 6, 1989 [GB] United Kingdom ............... 8907788
Aug. 30, 1989 [GB] United Kingdom ............... 8919566

[51] Int. Cl.$^5$ ............................................. F02C 7/22
[52] U.S. Cl. ....................................... 60/736; 60/734
[58] Field of Search .................. 60/39, 141, 734, 741, 60/39.08, 736

[56] References Cited

U.S. PATENT DOCUMENTS

| 3,420,055 | 1/1969 | Lavash . |
| 3,670,767 | 6/1972 | Mahorney . |
| 4,041,697 | 8/1977 | Coffinberry . |
| 4,716,719 | 1/1988 | Takahashi et al. ............... 60/39.06 |
| 4,897,994 | 2/1990 | Shekleton ....................... 60/39.141 |
| 4,984,424 | 1/1991 | Shekleton ....................... 60/734 |

FOREIGN PATENT DOCUMENTS

| 0307264A1 | 3/1989 | European Pat. Off. . |
| 739076 | 10/1953 | United Kingdom . |
| 972994 | 5/1961 | United Kingdom . |
| 2099509 | 12/1982 | United Kingdom . |

Primary Examiner—Louis J. Casaregola
Attorney, Agent, or Firm—Cushman, Darby & Cushman

[57] ABSTRACT

A fuel control valve arrangement is provided, which when connected to a number of fuel flow paths in the fuel system of a turbofan aeroengine, is capable of interconnecting them in several different fuel flow configurations as necessary to vary transport of heat around the fuel system. The valve arrangement has fuel ports as necessary to connect it to the fuel flow paths and transfer fuel between a diverter valve component and a fuel spill control valve component, each of which has independently translatable valve elements which are positionable to selectively prevent communication between the fuel ports. The spill control valve element is controllable to move progressively over a range of positions to throttle fuel flow to one of the ports and the connected fuel flow path which spills fuel back to a fuel supply tank.

4 Claims, 8 Drawing Sheets

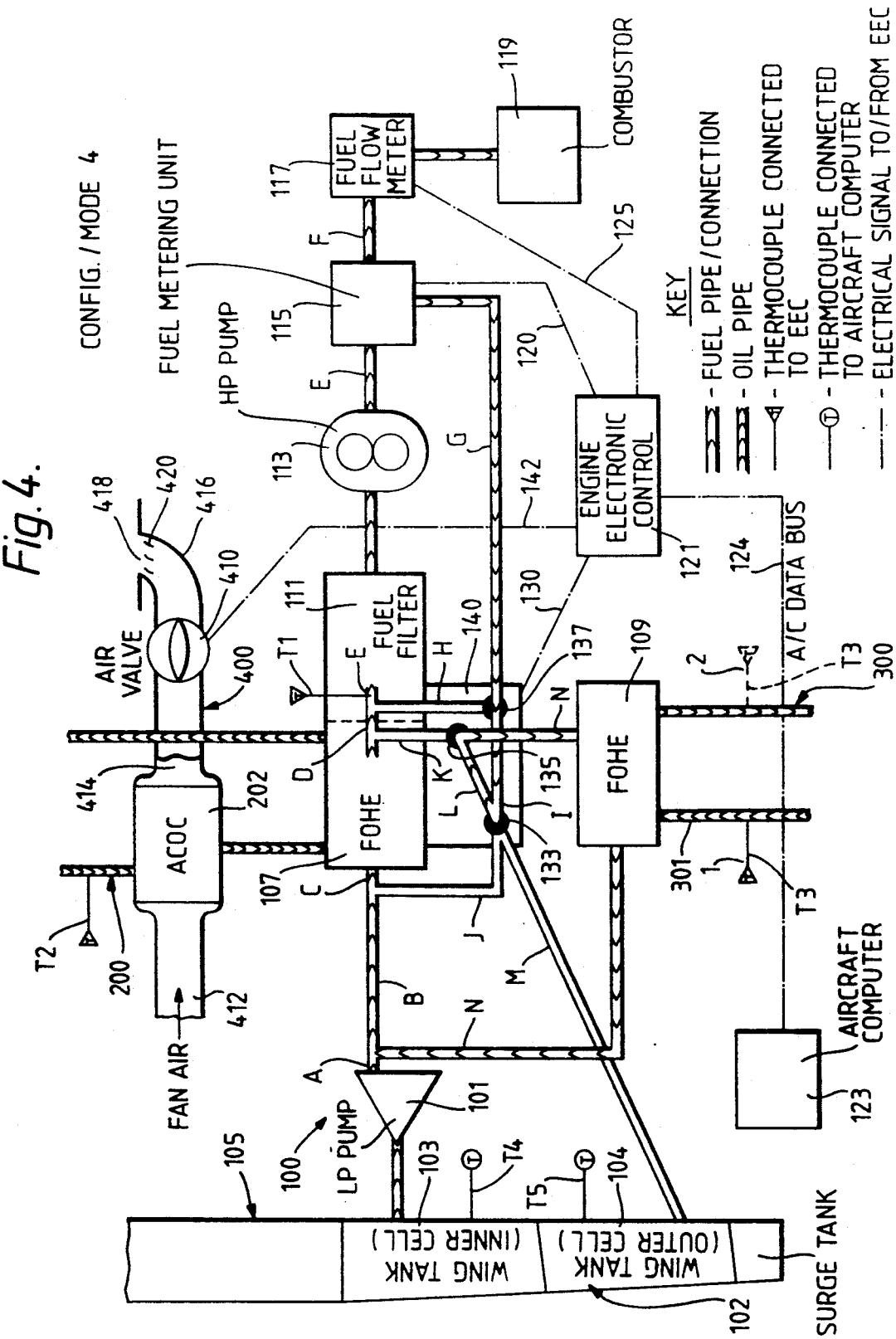

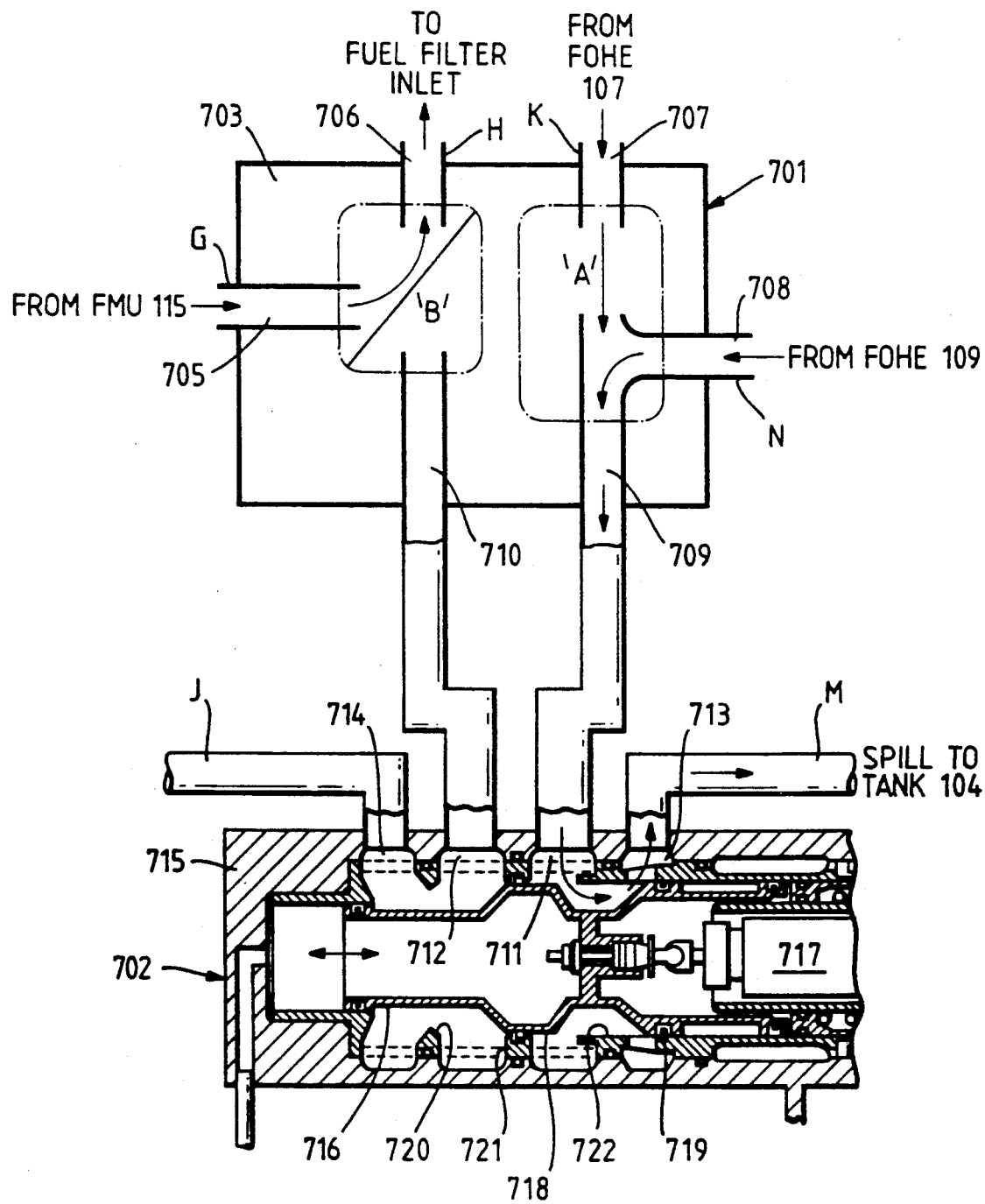
Fig. 5a. MODE 1

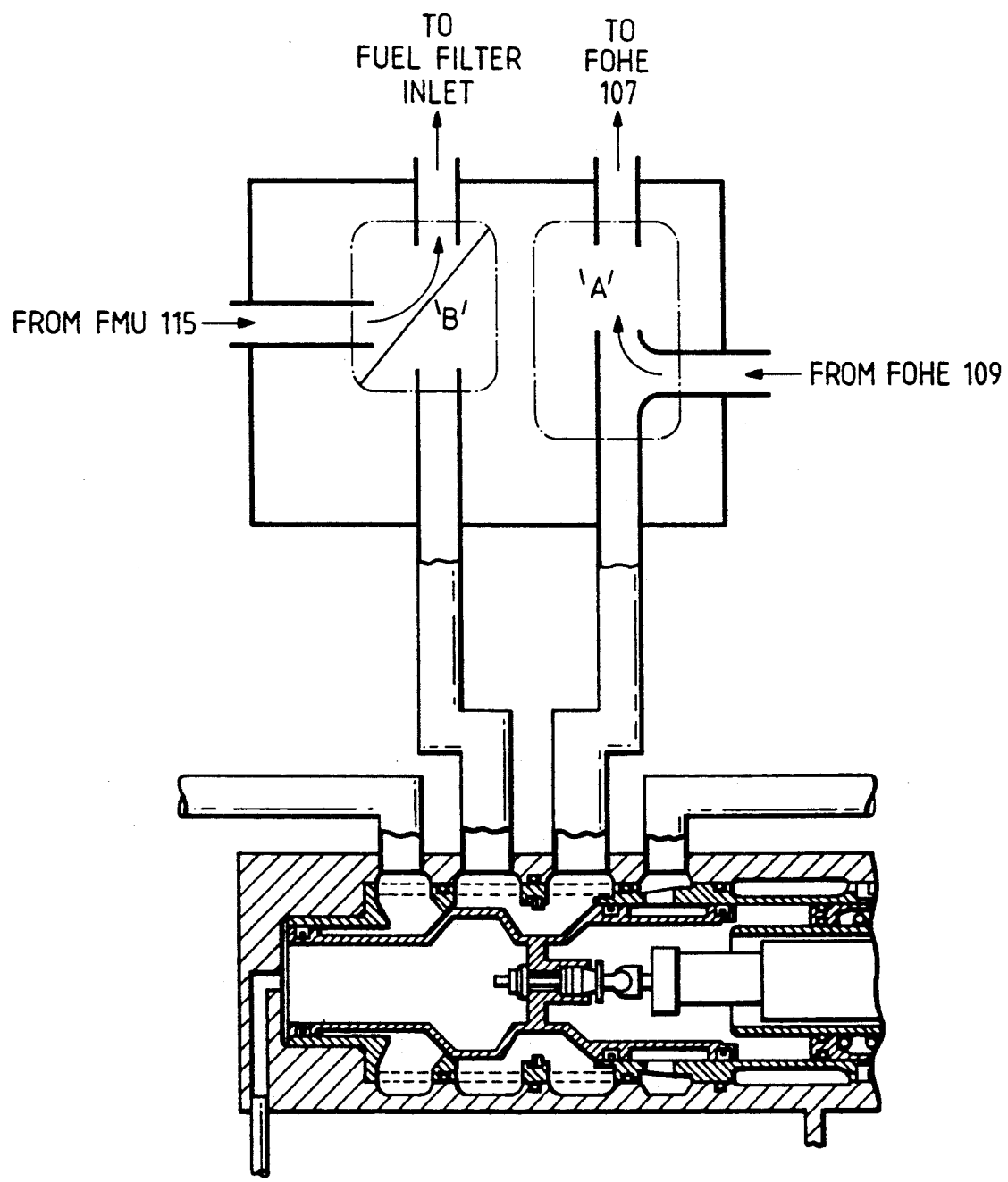

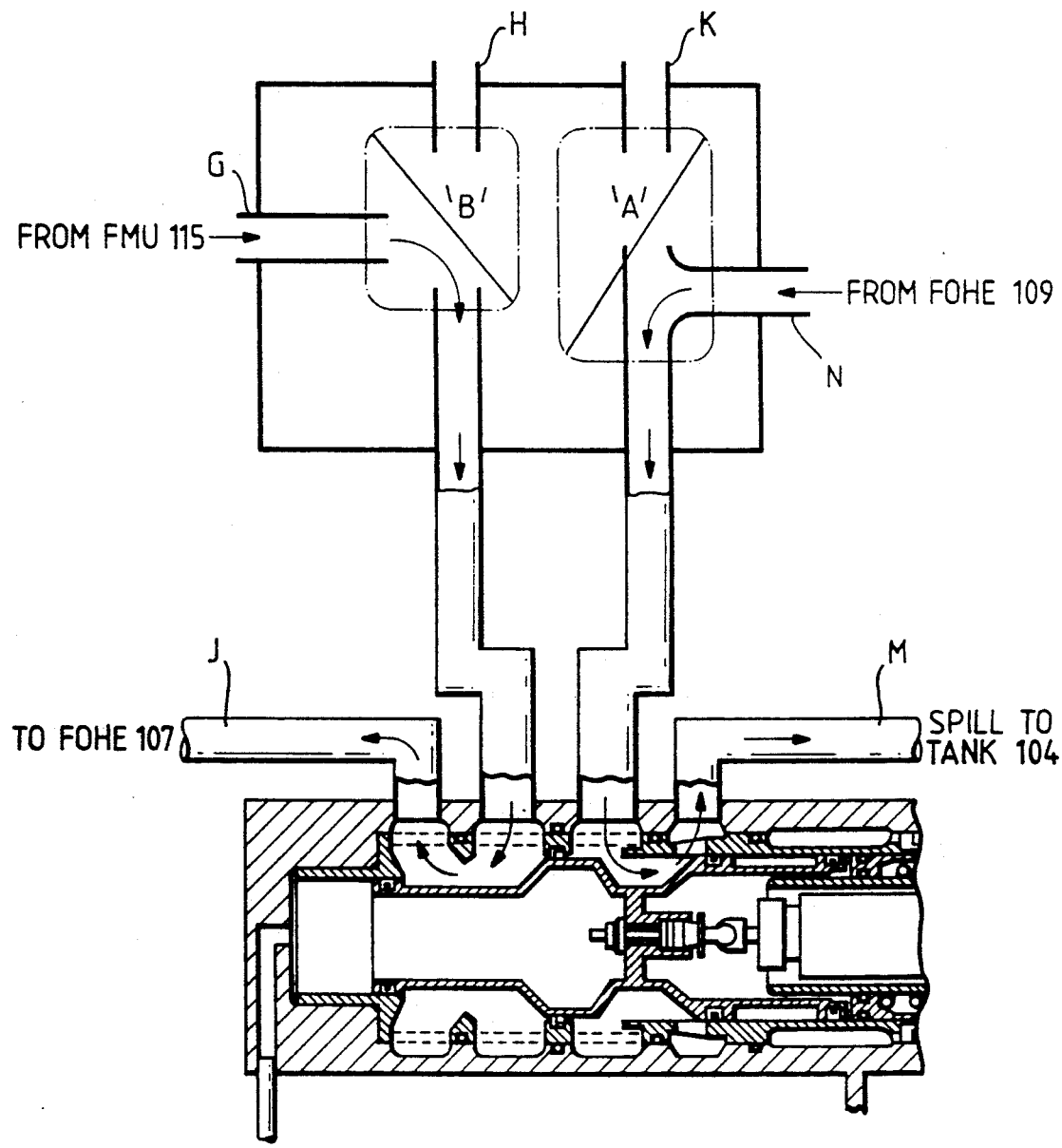

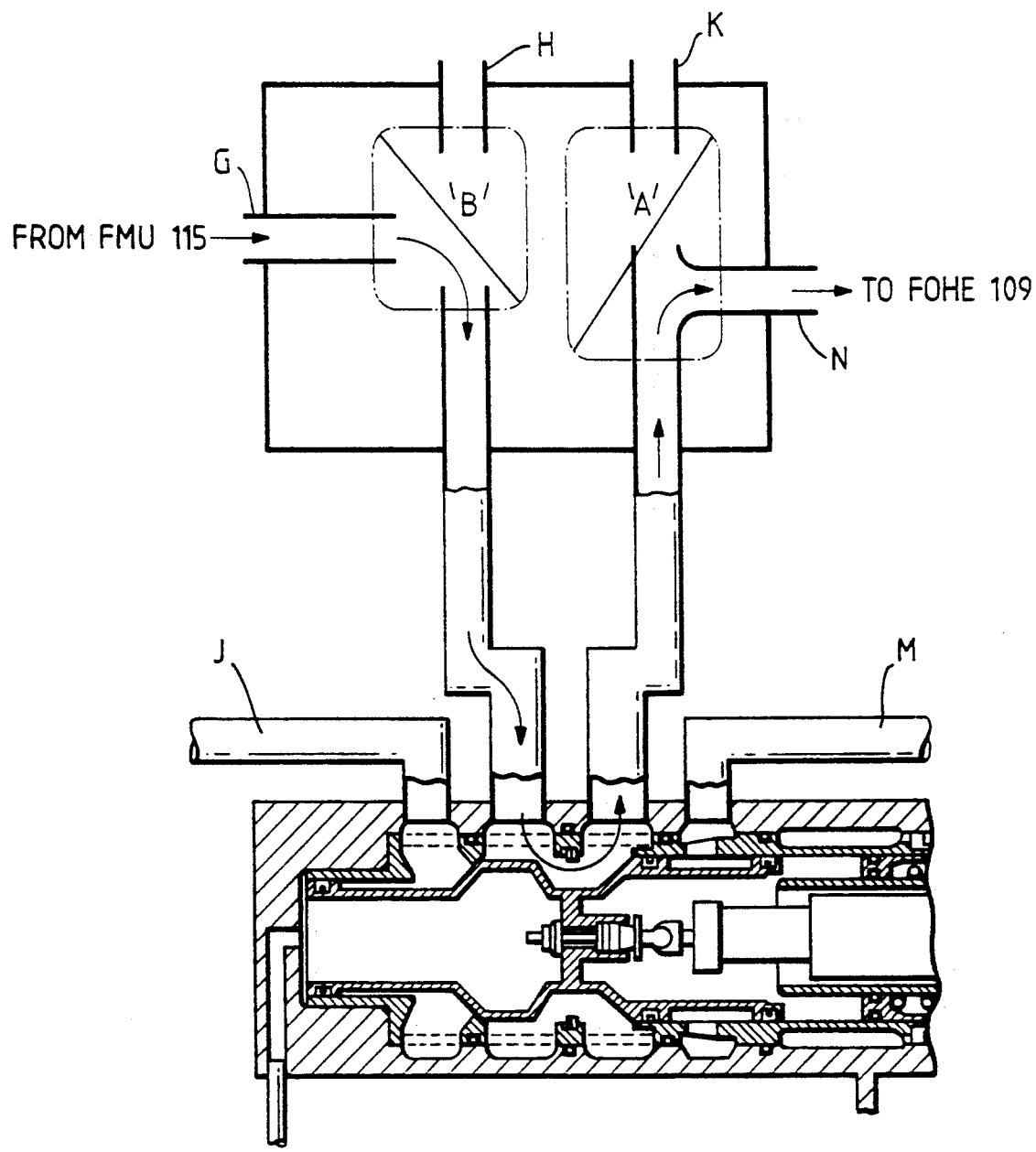
Fig. 5d. MODE 4

FUEL CONTROL VALVE FOR AN AIRCRAFT GAS TURBINE ENGINE FUEL SYSTEM

This is a continuation of patent application Ser. No. 07/504,017, filed on Apr. 4, 1990 (abandoned), which was abandoned.

FIELD

The present invention relates to a fuel control valve arrangement adapted for use in the fuel system of a gas turbine engine, particularly, but not exclusively, as part of a heat management system for such an engine in an aircraft.

BACKGROUND

Our co-pending patent application number GB8907788.7 discloses a heat management system for managing the heat generated in an aircrafts' turbofan engine installation. The heat management system described therein comprises basically four major fluid flow sub-systems, namely the engine's fuel system, the engine's oil system, the aircraft electrical power generator's oil system (this generator being driven as an accessory of the engine) and the engine's fan air bleed system. In addition the heat management system comprises a suit of software held for convenience in the memory of the engine's electronic controller, which also has authority over the functioning of the heat management system. For details of the software concepts which, through the electronic controller, control functioning of the heat management system, the reader is referred to the above-mentioned patent application.

The above mentioned fuel system comprises a plurality of fuel flow paths for interconnecting the other elements of the fuel system in a plurality of alternative fuel flow configurations with respect to flow of fuel around the fuel system. Diverting the fuel between the various fuel flow configurations is necessary in order to vary transport of heat around the heat management system and thereby keep various monitored temperatures within preassigned limits.

It is therefore an object of the present invention to provide a fuel control valve arrangement which, when connected to the fuel flow paths in the fuel system, is capable of performing the fuel diversion functions necessary to obtain the plurality of different fuel flow configurations.

Additional flexibility is built into the heat management system by giving it the facility to selectively dump excess heat to the environment either through the fan air bleed system already mentioned, or by returning fuel to the fuel tank in the aircraft's wing after it has been circulated through the fuel system, heat from the fuel being dissipated to the slipstream through the wing.

It is therefore a further object of the present invention to provide a fuel control valve arrangement like the one described above and also capable of selectively allowing return of fuel to the wing tank.

Because dumping heat through the fan air bleed system involves a fuel consumption penalty to the aircraft, it is desirable to utilise this facility as little as possible consistent with maintaining proper control over the monitored temperatures. Consequently, heat dumping by return of fuel to the aircraft wing tank is preferable, where possible, to heat dumping through the other route, and to provide proper control of the amount of heat dumped through the wing, the return flow of fuel to the wing tank should be variable over a range from zero to a maximum.

It is therefore a yet further object of the present invention to provide a fuel control valve arrangement which is capable of combining the required fuel diversion and metering functions.

SUMMARY OF THE INVENTION

According to the present invention there is provided fuel control valve means having a plurality of ports therein for connection to corresponding fuel flow paths in a gas turbine engine fuel system and comprising first and second valve means communicating with each other through further ports for passage of fuel therebetween, the first and second valve means having respective first and second obturating means independently translatable therein to selectively prevent communication between certain of the ports, whereby routing of fuel through the fuel flow paths is changeable according to the relative positions of the obturating means.

According to one aspect of the present invention, the first and second obturating means in the above fuel control valve means can be selectively positioned such that communication is prevented between a predetermined one of the ports and the other ports.

According to a further aspect of the present invention, one of the obturating means in the above fuel control valve means is adapted to move progressively over a range of positions between a first position in which flow of fuel into one of the ports is prevented, and a second position in which said one port is substantially unrestricted to the flow of fuel.

Preferably, the obturating means of the first valve means is adapted to perform a step change between first and second positions and the obturating means of the second valve means is adapted to move progressively over a range of positions between a first extreme position in which it prevents communication between one of the ports and the other ports, and a second position in which said one port is in substantially unrestricted communication with another port.

The preferred embodiment is constructed so that at one position of the first and second obturating means relative to each other, fuel flow between the first and second valve means is substantially prevented and all fuel flows are routed through the first valve means.

BRIEF DESCRIPTION OF THE DRAWINGS

An embodiment of the invention will now be described by way of example only and with reference to the accompanying drawings, in which:

FIGS. 2, 3 and 4 show the same heat management system in second, third and fourth fuel flow configurations respectively and operating in corresponding operational modes; and FIGS. 5a to 5d show in diagrammatic form a practical arrangement for a fuel valve unit in accordance with the invention capable of changing the heat management system between the four fuel flow configurations.

DETAILED DESCRIPTION OF EMBODIMENTS OF THE INVENTION

Figure 1:
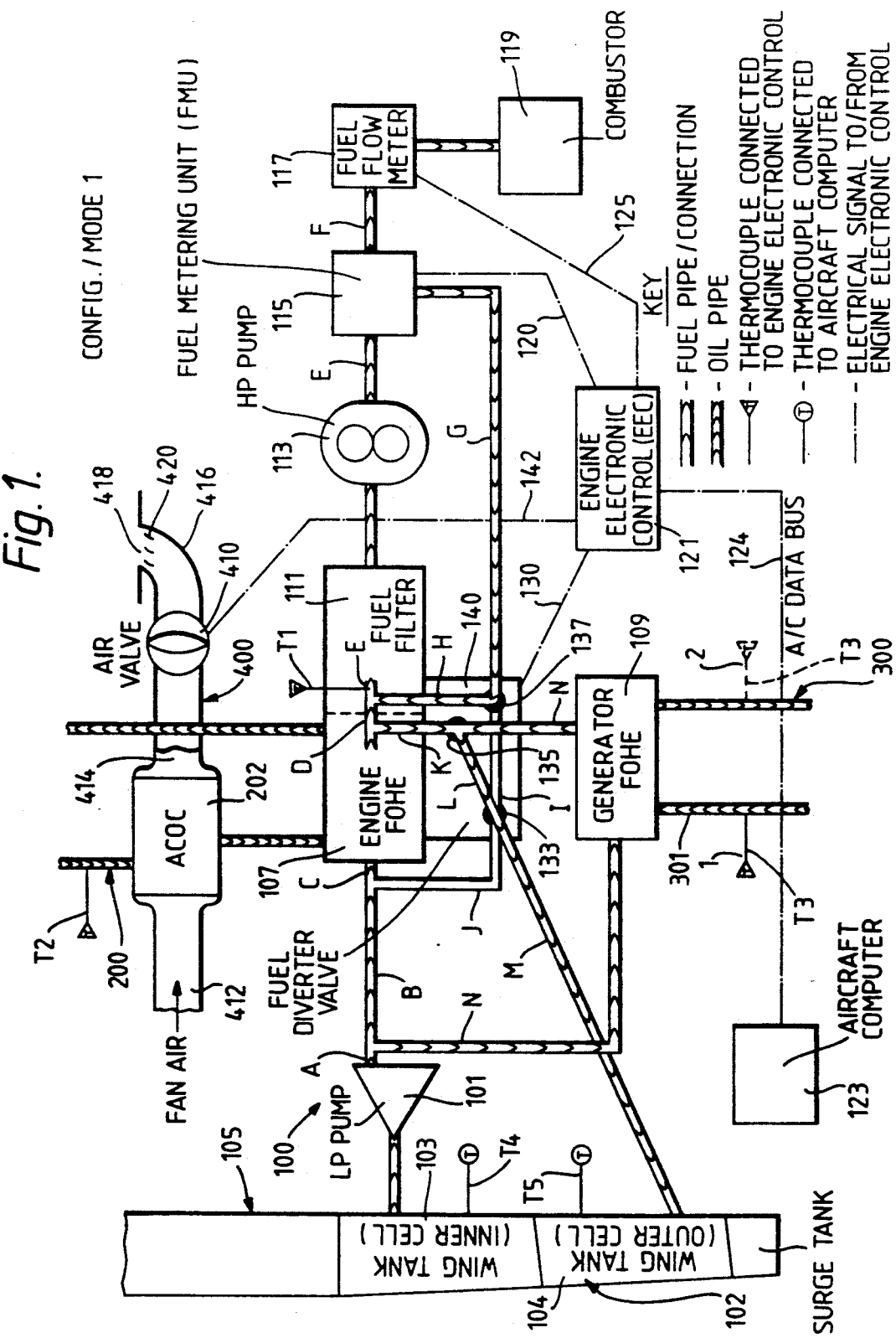
FIG. 1 is a schematic representation of a heat management system incorporating a fuel control valve in accordance with the present invention, the system being shown in a first fuel flow configuration and operating in a first operational mode.

Referring to FIG. 1, it is first necessary to describe the heat management system in some detail in order that the structure and operation of the illustrated embodiment of the invention be understood in proper context. However, for an overview of the task of the heat management system in relation to the engine and the aircraft, our copending patent application number GB8907788.7 should be consulted.

The heat management system is for a turbofan aeroengine in an aircraft, and its four major fluid-flow subsystems are indicated generally in FIG. 1, namely:

the engine's fuel system 100
the engine's oil system 200
the aircraft electrical power generator's oil system 300 (this generator being driven by the engine as an accessory)
the engine's fan air bleed system 400.

Figure 2:
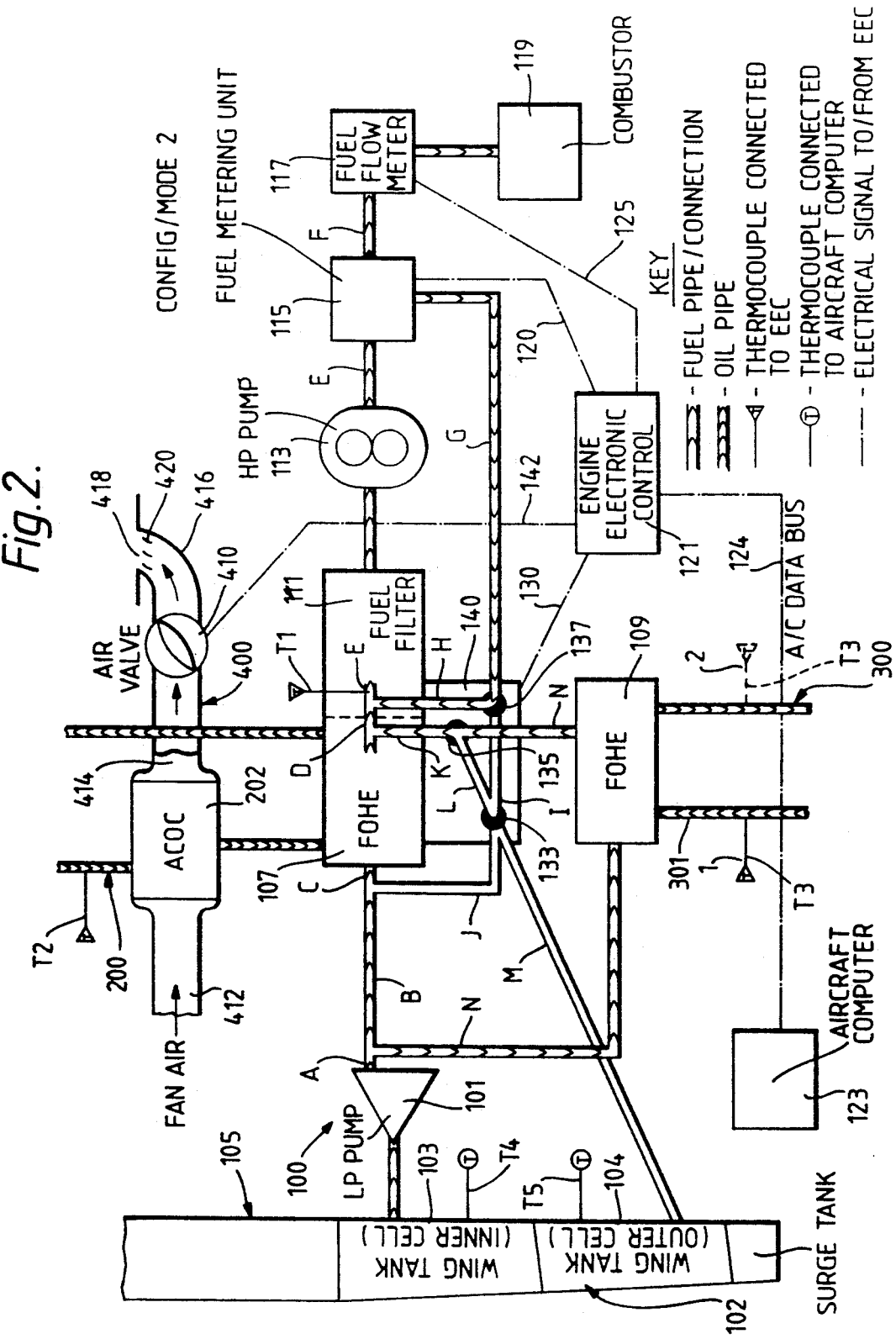
Figure 3:
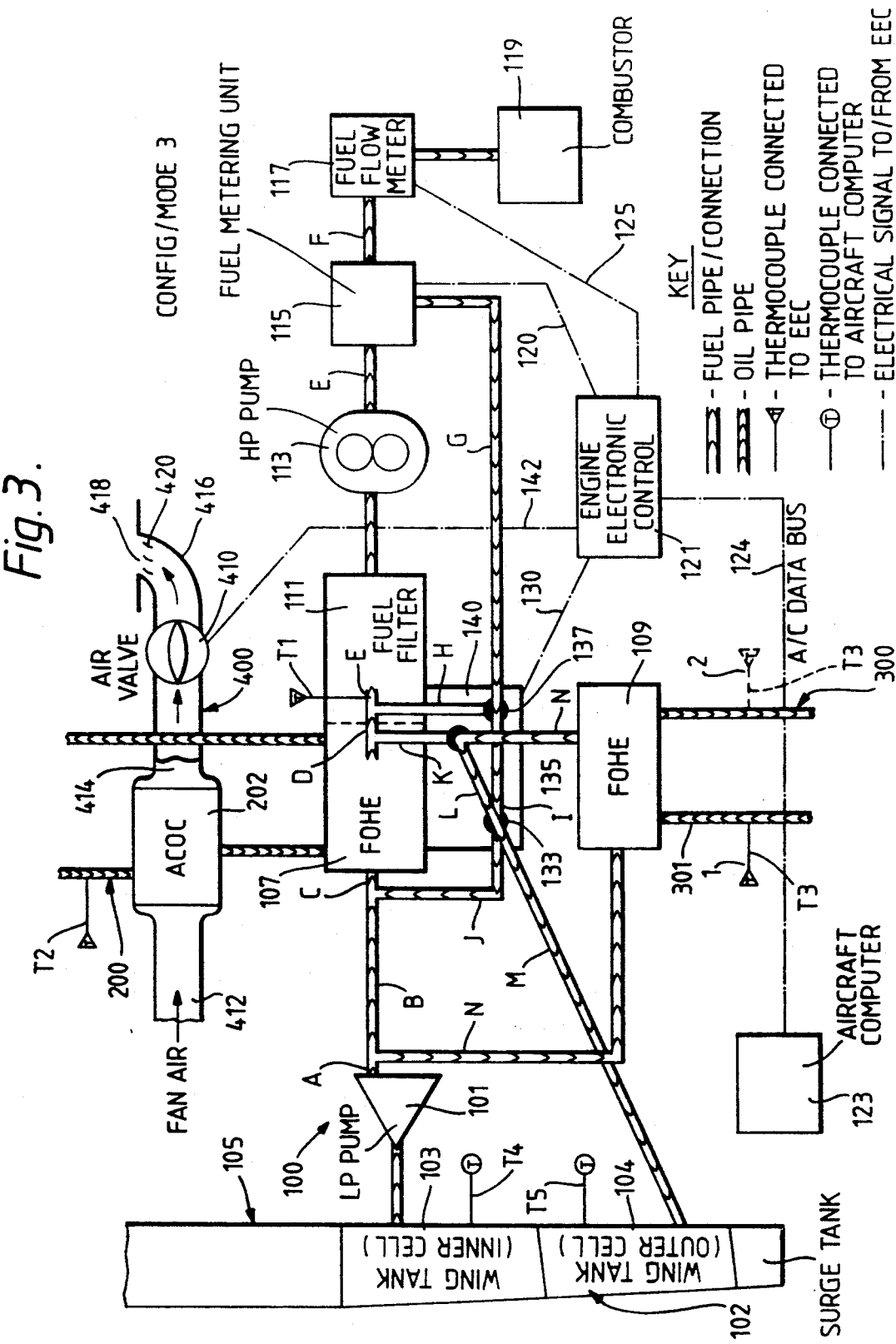

It should be noted that in FIG. 1 and in the further FIGS. 2 to 4, fuel flows in the fuel system 100 are indicated by widely spaced chevrons, oil flows in the engine oil system 200 and the generator oil system 300 are indicated by closely spaced chevrons, and fan air flows in the fan air bleed system 400 are indicated by arrows.

FUEL SYSTEM

The fuel system 100 has four alternative fuel flow configurations or modes as shown in FIGS. 1 to 4.

In all the modes a low pressure fuel pump 101 draws fuel from the inboard cell 103 of the fuel tank 102 in the aircraft wing 105 and passes at least a portion of it to the engine fuel-to-oil heat exchanger (FOHE) 107 through path A,B and C of the fuel system. In three of the modes, shown in FIGS. 1 to 3, some of the fuel from pump 101 is also passed to the generator's FOHE 109 through path N which branches off from path AB. However, in the fourth mode, shown in FIG. 4, the flow of fuel in path N is reversed, FOHE 109 in this instance being made part of a fuel return loop as explained later.

The engine's FOHE 107 puts the fuel system 100 and the engine oil system 200 in heat exchange relationship with each other, while the generator's FOHE 109 puts the fuel system 100 and the generator oil system 300 in heat-exchange relationship with each other.

At least a portion of the fuel output of the engine's FOHE 107 is passed along paths D and E through a fuel filter 111 and thence directly to a high pressure fuel pump 113, whose high pressure output goes to a fuel metering unit (FMU) 115. At least part of the input to the FMU 115 is passed from its output along path F to a fuel flow meter 117 and the combustor 119. FMU 115 meters the fuel supplied to the combustor 119 in accordance with fuel control signals 120 from the engine electronic control (EEC) 121. Any fuel supplied by pump 113 which is surplus to the engine's combustion requirements as determined by EEC 121 and FMU 115 is recirculated back to an earlier part of the fuel system through a pump spill return loop incorporating path G. However, the rest of the pump spill return loop has paths which vary according to the current fuel flow configuration as explained later.

In two of the fuel flow configurations (FIGS. 1 and 3), some of the fuel which has been pumped by the low pressure pump 101 is passed back to the outboard cell 104 of fuel tank 102. This is used as a way of dumping heat from the main part of the fuel system to the fuel tank 102 and thence to the atmosphere, and will be more fully explained later.

The fuel control signals 120 from the EEC 121 are applied to a motorised valve (not shown) within the fuel metering unit 115, so as to schedule the fuel flow to the engine in accordance with control laws built into the EEC 121 concerning the fuel flow which the engine requires in order to deliver the thrust currently being demanded by the pilot. A signal representing the thrust demanded is passed to EEC 121 from the aircraft computer 123 via a data bus 124, but in producing the fuel control signals 120 the EEC 121 also takes into account input signals (not shown) from various sensors which monitor conditions in the engine such as temperatures and pressures. Obviously one other important input signal is the fuel flow signal 125 from the fuel flow meter 117 which enables the EEC 121 to monitor actual fuel flow to the engine.

The EEC 121 may also control other subsystems of the engine in response to various sensor and control inputs—for instance, it may schedule the positions of variable guide vanes or bleed valves in the compressor. However, an aspect of the present invention is to utilise the EEC 121 in order to control the heat exchange relationships between the fuel system 100, the oil systems 200 and 300, and the environment. It does this by monitoring temperature signals from thermocouples T1 to T5 situated as shown at various points in the fuel system, the engine oil system and the generator oil system, comparing the temperatures with allowed limits in those systems, and outputting control signals 130 and 142 to control respectively a motorised fuel diverter valve unit 140 in the fuel system 100 and a motorised air modulating flap valve unit 410 in the fan air bleed system 400.

For convenience of illustration in FIGS. 1 to 4, the diverter valve unit 140 is shown as comprising three different valves 133,135 and 137, but a more practical arrangement will be described in relation to FIG. 5.

Through fuel diverter valve unit 140, the EEC 121 selectively varies the route which some of the fuel pumped by the low and high pressure pumps 101 and 113 takes through a number of fluid flow paths G to N provided in the fuel system. Thus, the EEC 121 operates valve unit 140 to achieve the four alternative fuel flow configurations illustrated in FIGS. 1 to 4 respectively, each of which facilitates a different heat exchange relationship between the fuel system 100, the engine and generator oil systems 200 and 300, and the environment, as will be explained later.

It may be mentioned at this point, however, that operation of the fuel diverter valve unit 140 under control of the EEC 121 varies the routes which the fuel takes around the fuel system in the following major respects.

(a) Pump Spill Return Loop. This is changed between routes defined by paths G,H in FIGS. 2 and 3, paths G,I,J in FIG. 4 and paths G,I,L,N in FIG. 5. Route G,H puts the spill fuel back into the main fuel flow line just before the fuel filter 111, route G,I,J puts it back just before FOHE 107 and route G,I,L,N puts it back just after the low pressure pump 101 by means of reverse flow through path N, which includes the generator's FOHE 109.

(b) Generator FOHE 109 Supply Loop. This is changed between routes defined by paths N,L,M in FIGS. 2 and 4, paths N,K, in FIG. 3 and paths G,I,L,N in FIG. 5. Route N,L,M takes fuel from the output of the low pressure pump 101 and returns it to the outboard cell 104 of the fuel tank in the aircraft wing 105. Route N,K also takes fuel from pump 101, but puts it back into the main fuel line just after the engine's FOHE 107. Route G,I,L,N incorporates the FOHE 109 in the pump spill return loop as mentioned in (a) above.

(c) "Back-to-Tank" Fuel Return Loop. Starting from the low pressure pump 101, this is changed between routes defined by paths A,B,C,K,L,M and A,N,L,M in FIG. 2, and paths A,N,L,M only in FIG. 4. There is no fuel tank return loop in FIGS. 3 and 5. Route A,B,C,K,L,M takes fuel out of the main fuel flow line just after the engine s FOHE 107 and passes it straight back to the outer wing tank 104. Route A,N,L,M comprises the generator's FOHE 109 supply loop as mentioned in (b) above.

ENGINE OIL, SYSTEM AND FAN AIR BLEED SYSTEM

Through flap or butterfly valve unit 410, the EEC selectively varies the amount of fan bleed air allowed to pass through the fan air bleed system 400. The latter comprises an intake duct 412 leading to the air-cooled oil-cooler (ACOC) 202, an intermediate duct 414, for passing air from the ACOC 202 to the flap valve unit 410, and an outlet duct 416, which conveys the fan bleed air to an exit nozzle 418 in the exterior surface of the engine's nacelle, where it joins the slipstream after being turned in the appropriate direction by turning vanes 420.

Under the control of the EEC 121, the flap valve unit 410 can vary the rate of heat dumping from the engine oil system 200 to the environment (via the fan air stream) from a very low value, when the valve is closed as shown in FIG. 1 and essentially no fan bleed air is passing through the ACOC 202, to a high value, when the valve is fully open as shown in FIG. 3 and a maximum mass flow rate of fan bleed air is passing through the ACOC. The actual valve position is selected by the EEC 121 in order to give the minimum airflow required to maintain fuel system and engine oil system temperatures within their limits, as measured by thermocouples T1 and T2 respectively which are connected directly to the EEC 121. The airflow through the fan air bleed system 400 is minimised because of its adverse impact on the engine's specific fuel consumption, due to usage of fan air which would otherwise be contributing to the thrust of the engine and also due to aerodynamic drag in the ACOC 202 and associated ducting 412,414,416.

GENERATOR OIL SYSTEM

Besides the heat exchange loop 301 from the generator itself (not shown) through the generator's FOHE 109, the generator oil system 300 also includes a charge pump (not shown) to keep the oil circulating and a scavenge filter (not shown) to prevent circulation of damaging particles with the oil. A thermocouple T3, connected directly to the EEC 121, is situated in the loop 301 just before the FOHE 109 to monitor the generator oil temperature. Alternatively, as shown by dashed lines, it could be situated just after the FOHE 109.

SYSTEM LOG

Before describing in detail the differing operational modes of the heat management system with reference to FIGS. 1 to 4, a brief review of the control philosophy, implemented by the system's program control logic incorporated in EEC 121, will be given.

The usage of airflow through ACOC 202 is kept to the absolute minimum consistent with maintaining fuel and oil temperatures within their set limits. To achieve this, fuel recirculation to the wing tank is maximally utilised wherever possible before air valve 410 is opened, consistent with maintaining overall control.

In modes 1 and 3 both the air valve 410 and the fuel spill valve in valve unit 140 can be modulated simultaneously to enable dumping of heat from both the fuel and oil circuits, which can overload independently of each other whilst in these modes. However, in modes 2 and 4, the only cooling control facility is the air valve 410.

Drive of each control loop between the EEC 121 and the valves 140 and 410 is in response to temperature error signals and "highest wins" gate selection of the temperature errors in the fuel, engine oil and generator oil flowpaths.

For a detailed description of the system's program control logic, U.S. patent application Ser. No. 503,908, filed Apr. 4, 1990 should be consulted.

DESCRIPTION OF OPERATIONAL MODES/CONFIGURATIONS

Referring now specifically to the flow configurations illustrated in FIGS. 1 to 4, FIG. 1 shows the system configured for operation in mode 1, which is a normal operational mode. This mode maximises use of the engine and aircraft fuel system as a heat sink, and should eliminate the requirement for air cooling of the engine oil system in ACOC 202.

Cooling of the generator oil system 300 and some cooling of the engine oil system 200 is achieved by setting the fuel control valves in unit 140 to allow normal fuel recirculation through the high pressure fuel pump 113 around path EGHE and recirculation of a controlled amount of low pressure fuel back to the aircraft wing tank 102 through paths LM after it has passed through FOHE 109 and FOHE 107. The tank 102 then absorbs and dissipates the heat of the recirculated fuel to maintain a temperature below a certain maximum value (say, 54° C.) at entry to the low pressure pump 101. Since only a proportion of fuel recirculated to the tank 102 has passed through FOHE 107, the remainder of the heat from the engine oil must be dissipated by the flow to the engine's combustor 119.

FIG. 2 shows operation in mode 2, which is the second normal mode. Here, the fuel being burned in the combustor 119 may provide a sufficient heat sink to cool both the generator oil system 300 and the engine oil system 200, the fuel control valves in unit 140 being set to allow normal fuel recirculation through pump 113 as for mode 1 but to allow all the flow through FOHE 109 to pass into the main flow to the engine. However, if there is insufficient heat loss from the oil systems to the fuel being passed to the combustor 119, the air valve 410 can be opened slightly to allow heat to be dumped from the engine oil system 200 to the fan air through ACOC 202.

FIG. 3 shows operation in mode 3, which is adopted in the event that the temperature of the fuel at the inlet of high pressure pump 113 is too high (this happens at very low engine speeds due to low flow to combustor 119 and recirculation of fuel from the fuel metering unit 115). In this flow configuration the fuel control valves in unit 140 are set to cause the fuel recirculated along path G to return to the main flow before the engine's FOHE 107 and to allow fuel which has been heated in the generator's FOHE 109 to flow back to the wing tank 102 along paths NLM. The air valve 410 is set fully open for maximum dumping of heat from the engine oil system to the fan air. Hence, heat flows from the fuel to the engine oil in FOHE 107 and from the engine oil to the fan air in ACOC 202 in order to keep both the fuel and the engine oil within the specified temperature limits. The generator oil is kept from overheating by recirculating all the fuel passing through FOHE 109 to the wing tank, through of course this flow is minimised as far as possible.

FIG. 4 shows operation in mode 4, which is adopted when mode 3 is no longer an acceptable state, due primarily to the generator oil system 300 tending to over-temperature, or the recirculation to wing tank being unacceptable, the latter being due either to the flow into the tank exceeding 100° C. or a shut-off signal appearing on the aircraft data bus. In this state the fuel control valves in unit 140 are set to cause the fuel recirculated along path G to be passed through FOHE 109 and hence to the outlet of the low pressure fuel pump 101. Hence, the heat generated by pumping the fuel, and in the generator oil system, is passed into the FOHE 107. The air valve 410 being still open, the heat dumped through ACOC 202 to the fan air is the combined heat generated by the fuel system, the generator oil system, and the engine oil system.

VALVE CONTROL OF FUEL DIVERSION AND RECIRCULATION TO WING TANKS

As mentioned previously, valve unit 140, shown only schematically in FIGS. 1 to 4, actually comprises the combination of a fuel diverter valve 701 and a fuel spill control valve 702 as shown diagrammatically in FIGS. 5a to 5d, representing respectively the positions adopted for realising system operating modes 1 to 4.

The diverter valve 701 is a sleeve valve comprising a valve body 703 provided with six ports 705-710. Ports 705,706 and 710 inter-communicate selectively as shown diagrammatically in area B. Ports 708 and 709 always communicate with each other but both communicate selectively with port 707 in area A. Areas A and B are bounded by dashed lines and represent a pair of cavities within the valve body 703, with which the ports communicate. Each cavity is provided with an apertured internal sleeve (not shown), which is linearly translatable to cover or uncover the ports in the walls of the cavity so as to provide the desired intercommunication between the ports. The sleeves are spring-biased and connected to a solenoid (not shown) through a fuel driven servo (not shown) so that they assume a first position when the solenoid is energised against the spring and a second position under the action of the spring when the solenoid is not energised. The results of the first and second positions in terms of permitted fuel flows through the diverter valve are indicated by arrows, diagonal lines being drawn across spaces A and B to indicate prohibited communication between ports. The first position of the sleeve valves is assumed for operational modes 1 and 2 (FIGS. 5a and 5b) and the second position for modes 3 and 4 (FIGS. 5c and 5d).

As indicated, ports 705 to 708 are connected to fuel system flow paths G,H,K and N marked in FIGS. 1 to 4. Ports 709,710 simply carry fuel to or from the diverter valve 701 to other ports 711,712 in the spill control valve, and may be considered to perform a similar function to imaginary flow paths I and L within the valve unit 140 shown in FIGS. 1 to 4, though they are not otherwise equivalent.

The fuel spill control valve 702 is an in-line spool valve provided with four ports 711-714 in a body 715. Ports 714 and 713 are connected to fuel system flow paths J and M respectively as indicated.

The spool 716 is axially translatable in the directions shown by the double-headed arrow by means of a torque-motor-driven screw-jack arrangement 717. Enlarged diameter lands 718,719 are provided on the spool 716 and these mate with corresponding internal lands 720,721 and 722 of the bore in which the spool 716 slides. Selective positioning of the spool in relation to the lands thereby provides the changes in interconnection of the ports 711-714 (necessary to change fuel flow configurations between operating modes 1 to 4 in conjunction with the diverter valve 701) and also modulation of the amount of fuel spilled into flow path M for recirculation to the wing tank. If "closed" for valve 702 is defined as that "hard-over" position of spool 716 shown in FIGS. 5b and 5d (Modes 2 and 4) at which no spill into path M occurs, and "open" is defined as that position range of the spool where land 718 on the spool is engaged with land 721 in the bore, thereby allowing communication between ports 712 and 714 at one end of the valve, and between ports 711 and 713 at the other end, then the following Table can be drawn up to show how the positions of the diverter valve 701 and the fuel spill control valve 702 are selected to provide the four fuel flow configurations of the system, corresponding to operating modes 1 to 4.

TABLE

| Mode | Diverter Valve Position | Fuel Spill Control Valve Position |
|---|---|---|
| 1 | energised | open |
| 2 | energised | closed |
| 3 | deenergised | open |
| 4 | deenergised | closed |

Although the diverter valve 701 is described in the above embodiment as a dual sleeve valve this is not essential to the invention and its functions could be performed by an alternative type, such as an appropriately designed spool valve. Similarly, spool valve 702 could be replaced by an alternative sleeve valve. For closed loop control of the two valves 701,702 by the program in EEC 121, positional feedback from the valves to EEC 121 is necessary. This can be readily provided by a microswitch in the case of the two-position diverter valve 701 and by a linear variable differential transformer (LVDT) in the case of the fuel spill control valve 702.

An LVDT can also be utilised to give positional feedback for the air valve 40.

I claim:

1. A valve combination for a gas turbine engine fuel supply system, the fuel supply system having a plurality of fuel flow paths, the valve combination comprising first valve means and second valve means, the first and second valve means being connected to each other by further fuel flow paths for the passage of fuel therebetween, each valve means comprising valve body means defining internal valve cavity means, ports in the valve body means for connection of the valve cavity means to corresponding fuel flow paths in the fuel supply system, further ports in the valve body means for connection of the valve cavity means to the further fuel flow path means for the passage of fuel between the first and second valve means, and port obturating means translatable within the valve cavity means to selectively obturate the ports, the port obturating means of the first and second valve means being translatable between a plurality of positions relative to each other and to the ports with said port obturating means of each of said first and second valve means having a first relative position allowing passage of fuel from a first fuel flow path in the fuel supply system to a second fuel flow path in the fuel supply system by way of a first further fuel path between said first and second valve means, and a second relative position of the respective port obturating means which, in addition to maintaining the passage of fuel effected by the said first relative position, also allows the passage of fuel from a third fuel flow path in the fuel supply system to a fourth fuel flow path in the fuel supply system by way of a second further fuel flow path between said first and second valve means.

2. The valve combination as claimed in claim 1 wherein one of said ports of said first valve means is connected to a metering valve means and said first valve means has means for moving said port obturating means of said first valve means between two positions, one position permitting and the other position preventing flow between said metering valve means and said second valve means.

3. The valve combination as claimed in claim 1 wherein one of said ports of said first valve means is connected to a metering valve means with another of said ports being connected to a fuel filter inlet and said first valve means has means for moving said port obturating means of said first valve means between two positions, one position permitting and the other position preventing flow between said metering valve means and said fuel filter inlet.

4. A gas turbine engine including said valve combination as claimed in claim 1.

* * * * *